Patented Sept. 4, 1951

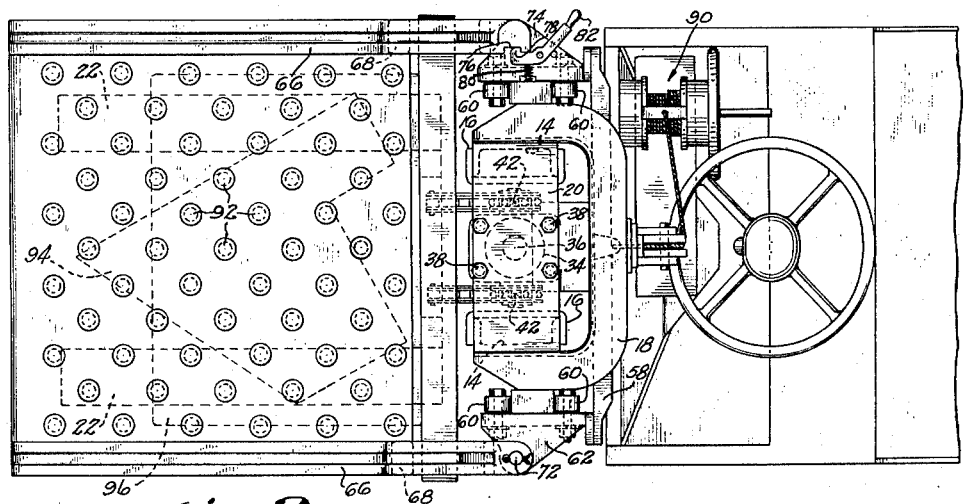

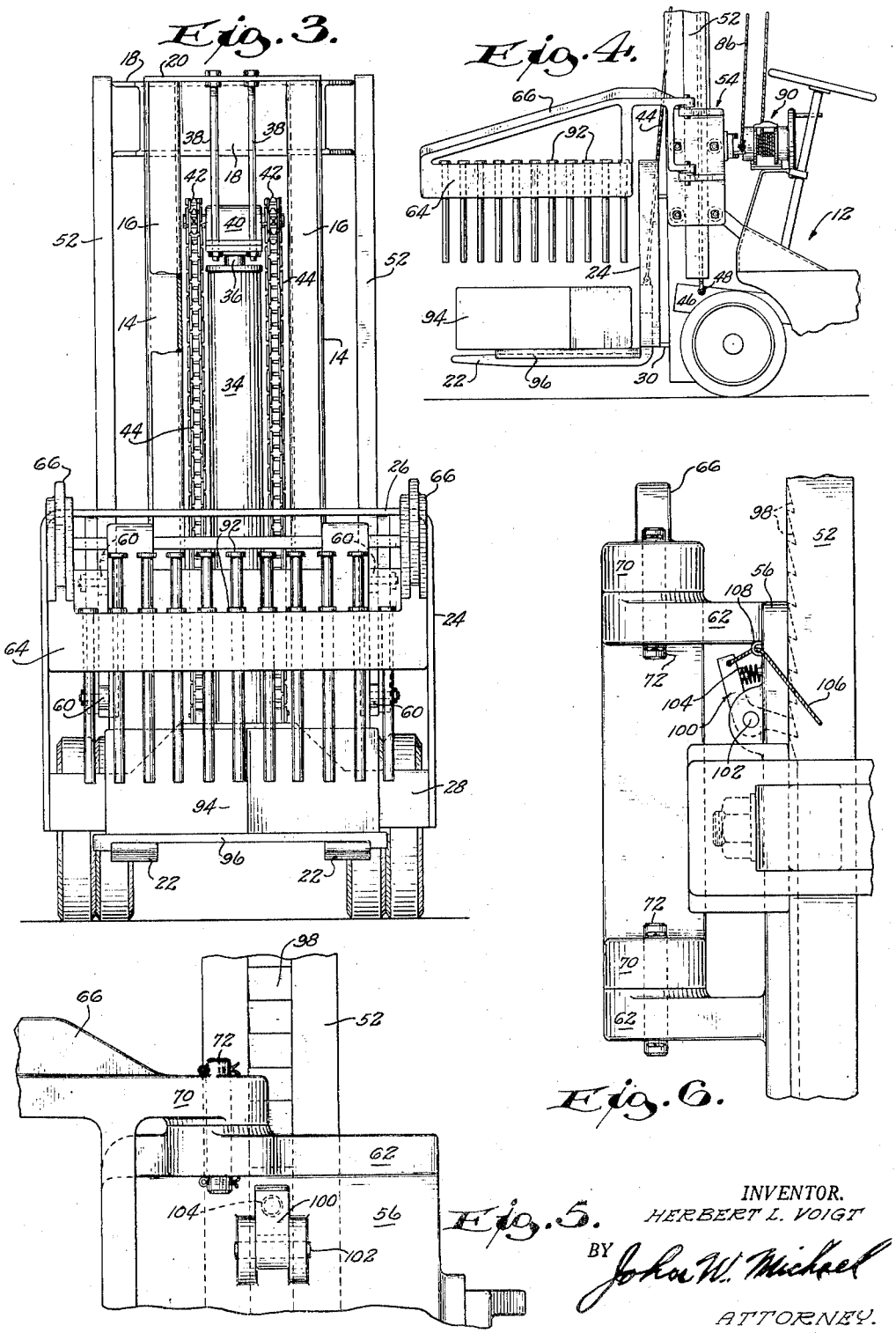

2,566,863

UNITED STATES PATENT OFFICE 2,566,863

LOAD RETAINING MEANS FOR INDUSTRIAL VEHICLES

Herbert L. Voigt, Milwaukee, Wis., assignor to Geuder, Paeschke & Frey Co., Milwaukee, Wis., a corporation of Wisconsin Application July 6, 1948, Serial No. 37,269

6 Claims. (Cl. 214—113)

This invention relates to a device for confining the load on and preventing slippage from industrial vehicles, particularly those vehicles known as lift trucks.

Industrial lift trucks are used extensively to lift, transport, and stack many types of loads which are generally piled on pallets for convenience in handling. The use of such trucks results in great operational savings, but these savings are somewhat diminished by lost time and material damage consequent to the load slipping from the truck. Such slipping may be caused by defects or inclination of the surface on which the vehicle operates, oily or carelessly piled materials, or by careless truck operation such as rapid starting and stopping.

It has previously been proposed to provide means to "sandwich" and clamp the load on the vehicle. A device of such nature may be satisfactory for regularly shaped and piled dry loads but is of no use when applied to loads of irregular shape, uneven heights, or, for example, oily castings. Furthermore, when such devices are employed, the other uses of the truck are considerably limited and normal operation and versatility are sacrificed.

The present device overcomes all the above disadvantages through the use of means adapted to engage side surfaces of or to confine the load to positively prevent slippage. The device may be brought into operation at will and mounted in such a way that all normal uses of the lift truck are available. More particularly, a vertically movable platform or frame is mounted on the mast of an industrial lift truck above the forks or other load carrying part of the truck. As will appear hereinafter, various methods may be employed to control and limit movement of the frame. A plurality of depending pins are carried by the frame and are adapted to confine the load to effectively "fence" the load within a given area. The frame may be lowered onto the load or the load raised up to the frame to additionally "sandwich" or clamp the load between the forks and the frame.

It is an object of this invention, therefore, to provide means for positively preventing load slippage from vehicles whether or not the load is regular in shape or even in height.

Another object is to provide means for confining the load carried by a vehicle to prevent load slippage therefrom.

A further object is to provide means for preventing load slippage from a vehicle while not interfering with normal operation of the vehicle.

Other objects and advantages will be pointed out in, or be apparent from, the specification and claims, as will obvious modifications of the two embodiments shown in the drawings, in which:

Fig. 1 is a side elevation of the front portion of an industrial lift truck equipped with the material confining mechanism;

Fig. 2 is a plan view of Fig. 1;

Fig. 3 is a front elevation of Fig. 1;

Fig. 4 is a side elevation similar to Fig. 1 but has the material confining mechanism raised above the load;

Fig. 5 is a fragmentary side elevation of a modified structure; and

Fig. 6 is a rear elevation of the structure shown in Fig. 5.

Referring in detail to the drawings, and particularly to the modification shown in Figs. 1 through 4, which illustrate the material confining mechanism as applied to a conventional lift truck which is shown for purposes of illustration only. It is to be understood that other lift trucks may be utilized in combination with my invention.

The lift truck comprises mast 10 mounted on the front of truck chassis 12. The mast consists of a pair of fixed upright channel members 14 and a pair of upright movable channels 16 cooperating with and slidably fitting over the legs of channels 14. Thus the inside movable channels 16 may be telescoped or moved relatively with respect to fixed channels 14, and channels 14, 16 cooperate to serve as vertical columns on which the lifting portion of the truck rides on bearings as will appear more fully hereinafter. U-shaped channel member 18 is welded to the outside of each of fixed channels 14 adjacent the upper end thereof to brace and space the channels 14 with respect to each other. A plate 20 is secured to the top of each of channels 16 to brace and space these channels especially when extended above fixed channels 14.

As is conventional, a load carrying mechanism is mounted on the movable channels 16 by means of bearings which, for the sake of clarity, are not shown in the drawings. The load carrying mechanism consists in a pair of outwardly projecting steel members or forks 22 mounted on a back board generally comprising side members 24, top cross bar 26, and back plate 28. Members 30, 32 connect the back portion of the fork assembly to the bearings, mentioned above, which ride on movable channel 16. It may be said in passing that these bearings generally consist in a bearing connected to member 30 and riding on the forward leg of channel 16 and another bearing carried by member 32 and riding on the rear leg of channel 16 to take the stress at the load points.

A hydraulic cylinder 34 is mounted between the two upright telescopic columns comprised of channels 14, 16. Operation of conventional hydraulic controls, not shown, will cause upward or downward movement of piston 36 mounted within cylinder 34. Piston 36 is connected to top cross plate 20 by means of four spacer and guide bars 38 and carries a crosshead assembly 40 which has a sprocket wheel 42 mounted on either side thereof. Thus operation of the hydraulic controls raises or lowers piston 36, crosshead 40, plate 20 and movable channels 16 to which plate 20 is welded.

Chains 44 are anchored at 48 on truck frame 46, engage with sprocket wheels 42, and are connected to cross member 28 on the back of the fork mechanism at 50. It will be clear that raising crosshead 40 will raise the forked mechanism riding on the columns, since chain 44 necessarily must run over sprocket 42 as the crosshead rises. It is also to be noted that the rate of ascent and descent of the forks will be twice the rate of the piston and crosshead. Thus as the hydraulic controls are operated to raise crosshead 40, movable channels 16 simultaneously rise with the crosshead at the same rate while the forks ride up the legs of movable channels 16.

A pair of upright posts 52 are added to mast 10 on the outside of the telescopic column structure and its associated U-shaped channel 18. The base of posts 52 may be welded or otherwise secured to the truck frame and the upper post ends are welded to the legs of U-shaped channel 18 to provide a fixed rigid support for the material confining mechanism. Carriage 54 is vertically movable on posts 52 and comprises end plates 56 welded to and spaced by cross bar 58. Each of the side plates 56 carries four bearings 60 which engage with and roll on either side of posts 52.

As may be seen most clearly in Figs. 1 and 2, side plate 56 on the left-hand side of the truck is provided with two triangularly shaped projections 62 which serve as hinge supports for the material confining mechanism. A frame or platform 64, including an upright brace 68 and T-section brace 66 adapted to rest on the top cross member 26 of the back of the fork mechanism when the frame is in its lowermost position and having forked ends 70 provided with holes cooperating with similar holes in triangular projections 62 on plate 56, is supported by and pivotally connected to carriage plate 56 by means of hinge pins 72, 72, passing through the cooperating holes. Platform 64 may be pivoted around the axis of pins 72 and may be locked in its operative or active position by means of a spring loaded lock assembly mounted on triangular projection 74 on right-hand carriage plate 56. The rearwardly projecting end of right-hand brace 66 is provided with a hook or nose 76 engaged by nose 78 biased in the operative direction by spring 80. The truck driver may either kick or manually move handle 82 in a counterclockwise direction, as viewed in Fig. 2, to disengage the latch mechanism and thus free frame 64 for pivotal movement about the axis of hinges 72.

Cross member 58 which is secured to plates 56 is provided with an eyelet 84 to which cable 86 is secured. The cable runs over pulley 88 mounted on the rearwardly facing portion of U-shaped channel member 18 and is connected to the drum of windlass 90. The operator, by turning the handle of the windlass, may raise or lower carriage 54 and frame 64 on post 52. Windlass 90 is, of course, provided with the conventional ratchet to prevent unwinding. It should be understood that other power means for raising and lowering frame 64 may readily be employed without departing from the spirit of this invention. For example, a hydraulically operated motor or windlass could readily be utilized in lieu of hand power, and it should be understood that this invention is not limited to the use of a hand windlass or to the use of the means illustrated in Figs. 5 and 6 for controlling movement of the material confining means.

Platform 64 is provided with a multiplicity of holes evenly spaced over the surface thereof. A headed pin 92 is mounted in each of the holes and biased by gravity to its lowermost position as determined by the length of the pin. These pins are freely slidable in the holes and when not engaging any obstruction, all the pins hang downwardly, as may be seen in Fig. 4. When platform 64 is lowered from the position illustrated in Fig. 4, some of the pins will strike irregularly shaped load 94 and be raised relative to the platform 64 as the platform continues its descending movement. Those pins which do not strike load 94 will stay in their lowermost position and confine load 94 within certain fixed limits by engaging with the sides of the load. Thus the load is "fenced in" and positively prevented from sliding off pallet 96 on which it rests and under which forks 22 are projected to raise the load for transportation or stacking.

It should be understood that this invention is not limited to the particular size or shape of pins 92, nor is it limited to using such a large number of evenly spaced pins, since it will be obvious that depending upon the load carried in general usage within a given plant, the number of pins may be varied and may even comprise merely simple rows adjacent the edges of platform 64. Even if small articles are to be transported on pallets, they may be of such nature as to permit of free sliding within the confines determined by the single row arrangement. It is also to be noted that pins need not be provided adjacent the rear edge of the platform since the fork back board will serve to limit load shifting in this direction.

It will be evident that this modification serves primarily for confining the load against skidding and sliding while the load is being transported. When it is desired to stack the load on the pallet in a high position necessitating movement of the fork mechanism upon the extended columns consisting of fixed channels 14 and movable channels 16, it is necessary to swing frame 64 out of the path of movement of the fork mechanism. As pointed out hereinbefore, this is a simple matter by releasing the latch on the right-hand side of the carriage and pivoting the platform about the axis of hinges 72. If it should be desired to employ this material confining mechanism concurrently with high stacking, it would be necessary to mount the carriage on movable channel 16 and mount pulley 88 on the top cross piece 20.

This material confining mechanism may be satisfactorily employed without the use of a separate power mechanism for raising and lowering the platform. The modification illustrated in Figs. 5 and 6 does away with windlass 90 and its associated pulley 88 and cable 86. In this modification the upright posts 52 mounted on either side of U-shaped channel member 18 are provided with vertically extending ratchet teeth 98, and carriage side plates 56 are provided with a pawl 100 pivoted at 102 and biased by spring 104 into engagement with teeth 98 to retain the carriage and frame 64 at any elevation on post 52. Carriage 54 may be raised simply by raising the forks until top cross member 26 of the fork back board strikes the underside of braces 66, whereupon continued upward movement of the forks will also raise carriage 54 and platform 64. Of course, if the load on pallet 96 is of such height that it strikes the underside of frame 64 before cross member 26 strikes brace 66, the movement will be transmitted from the fork mechanism through the load to the platform.

As pointed out above, pawl 100 will retain frame 64 at whatever elevation on post 52 it is left. To lower frame 64, it need only be raised a slight bit to allow free disengaging movement of the pawl. At this time the operator pulls cord 106 which is threaded through eyelet 108 on plate 56 and connected to the uppermost end of the pawl to move the pawl about its pivot in a clockwise direction (as viewed in Fig. 6) to disengage teeth 98 and allow the carriage to move downwardly with the fork mechanism.

Thus assuming the operator has frame 64 in an elevated position, he may readily fork his load and raise it up into operative relationship with respect to pins 92 so that the load will be confined. If he desires to carry the load lower than this position, he need only pull cord 106 and lower the entire combination. When it is desired to unload, the operator need only raise the combination to an elevated position and lower the load out of engagement with frame 64 which is retained in the elevated position by means of pawl 100.

From the above description of operation of the modification shown in Figs. 5 and 6, it will be apparent that a fixed platform 64 could be employed at a given distance above the floor if such an arrangement were satisfactory for the type of operations encountered in the particular plant and if the sacrificed versatility of the lift truck were not important to operations within the plant.

Since various modifications will occur to those skilled in the art in light of the drawings and the above description, it is to be understood that this disclosure is to be limited only by the scope of the claims.

I claim:

1. The combination with a vehicle having upwardly projecting mast means, support means movably mounted on said mast means for carrying a load, means for controlling movement of said support means on said mast means, of a member movably mounted on said mast means, a platform pivotally mounted on said member for movement into an active position above said support means and an inactive position, means for locking the platform in said active position, means for raising and lowering said platform and said member on said mast means, and means carried by said platform for confining the load on said support means.

2. The combination with a vehicle having upwardly projecting mast means, support means movably mounted on said mast means for carrying a load, means for controlling movement of said support means on said mast means, of a member movably mounted on said mast means, a platform pivotally mounted on said member for movement into an active position above said support means and an inactive position, means for locking the platform in said active position, means for raising and lowering said platform and said member on said mast means, and means carried by said platform for laterally confining the load on said support means, said platform being adapted to engage the top of the load.

3. The combination with a vehicle having upwardly projecting mast means, support means movably mounted on said mast means for carrying a load, means for controlling movement of said support means on said mast means, of a member movably mounted on said mast means, a platform pivotally mounted on said member for movement into an active position above said support means and an inactive position, means for locking the platform in said active position, means for raising and lowering said platform and said member on said mast means, and a plurality of depending pins carried by said platform for confining the load on the support means.

4. The combination with a vehicle having upwardly projecting mast means, support means movably mounted on said mast means for carrying a load, means for controlling movement of said support means on said mast means, of a member movably mounted on said mast means, a platform pivotally mounted on said member for movement into an active position above said support means and an inactive position, means for locking the platform in said active position, means for raising and lowering said platform and said member on said mast means, and a plurality of depending pins carried by and spaced on the platform, said pins being operative to confine the load on said support means and being inoperative when bearing against the top of the load.

5. The combination with a vehicle provided with an upwardly projecting mast having means movably mounted thereon for supporting a load, of a platform positioned above said supporting means, and a plurality of depending pins carried by and spaced on the platform, said pins being operative to confine the load on said support means and being inoperative when bearing against the top of the load.

6. The combination with a vehicle provided with an upwardly projecting mast having means movably mounted thereon for supporting a load, of a platform positioned above said supporting means, and a plurality of spaced members reciprocally mounted on and depending from said platform to confine the load on said support means.

HERBERT L. VOIGT.

REFERENCES CITED

The following references are of record in the file of this patent:

UNITED STATES PATENTS

| Number | Name | Date |
|---|---|---|
| 1,806,881 | Remde | May 26, 1931 |
| 1,876,219 | Gfrorer | Sept. 6, 1932 |
| 1,971,952 | Townsend | Aug. 28, 1934 |
| 2,050,821 | Vercoe | Aug. 11, 1936 |
| 2,273,359 | Johnson | Feb. 17, 1942 |
| 2,281,004 | Lehmann et al. | Apr. 28, 1942 |
| 2,281,012 | Sears | Apr. 28, 1942 |
| 2,399,824 | Pressman | May 7, 1946 |
| 2,403,356 | Francis | July 2, 1946 |
| 2,468,326 | Gleason | Apr. 26, 1949 |
| 2,496,079 | Wessman | Jan. 31, 1950 |